United States Patent [19]

Lommi et al.

[11] Patent Number: 5,612,072
[45] Date of Patent: Mar. 18, 1997

[54] PROCESS FOR THE PRODUCTION OF NON-ALCOHOLIC OR LOW ALCOHOL MALT BEVERAGE

[75] Inventors: Heikki Lommi, Kantvik, Finland; Wim Swinkels, Beek En Donk; Ben Van Dieren, Oedenrode, both of Netherlands

[73] Assignee: Cultor Ltd., Helsinki, Finland

[21] Appl. No.: 993,799

[22] Filed: Dec. 21, 1992

Related U.S. Application Data

[63] Continuation-in-part of Ser. No. 601,865, Oct. 23, 1990, abandoned.

[51] Int. Cl.$^6$ .................................................. C12C 11/00
[52] U.S. Cl. ................................ 426/11; 426/14; 426/16; 426/312; 426/319
[58] Field of Search .................................. 426/11, 14, 16, 426/13, 7, 18, 19, 62, 312, 319, 590, 592, 600, 474, 477, 486, 490, 493

[56] References Cited

U.S. PATENT DOCUMENTS

| | | | |
|---|---|---|---|
| 1,769,749 | 7/1930 | Mitchell | 426/14 |
| 4,355,117 | 10/1982 | Antrim . | |
| 4,430,348 | 2/1984 | Duncombe | 426/13 |
| 4,459,312 | 7/1984 | Hartmeier | 426/15 |
| 4,550,029 | 10/1985 | Krüger et al. | 426/29 |
| 4,661,335 | 4/1987 | Schur | 426/16 |
| 4,708,875 | 11/1987 | Godtfredsen | 426/15 |
| 4,746,518 | 5/1988 | Schur | 426/16 |
| 4,929,452 | 5/1990 | Hamdy | 426/29 |
| 5,079,011 | 1/1992 | Lommi et al. | 426/14 |

FOREIGN PATENT DOCUMENTS

| | | |
|---|---|---|
| 0213220 | 3/1987 | European Pat. Off. . |
| 2526274 | 11/1983 | France . |
| 2021146 | 11/1979 | United Kingdom . |
| 2085449 | 4/1982 | United Kingdom . |

OTHER PUBLICATIONS

Toshio Onaka et al., "Beer Brewing with Immobilized Yeast", Biotechnology, vol. 3, No. 5, May 1985, New York US, pp. 467–470 abstract p. 467, column 1, paragraph 4, p. 467, column 2, paragragh 3.

*Primary Examiner*—Leslie Wong
*Attorney, Agent, or Firm*—Kenyon & Kenyon

[57] ABSTRACT

The invention relates to a process for the production of substantially non-alcoholic beer by a continuous yeast treatment at a low temperature. In the process, wort which has been clarified and possibly treated by evaporating and/or with an adsorbing agent is passed through a packed column reactor containing immobilized yeast at a temperature ranging between the freezing point of wort and 10° C. The yeast is reactivated at 2° to 15° C. for 10–30 hours. If required, the reactor can be regenerated.

16 Claims, No Drawings

PROCESS FOR THE PRODUCTION OF NON-ALCOHOLIC OR LOW ALCOHOL MALT BEVERAGE

This application is a continuation-in-part of our prior application, Ser. No. 07/6001,865 filed Oct. 23, 1990, now abandoned.

FIELD OF THE INVENTION

The invention relates to a process for the production of substantially non-alcoholic beer (that is, a beverage having the taste characteristics of beer) by a continuous yeast treatment at a low temperature. The process utilizes a packed column reactor containing immobilized yeast preferably reactivated at intervals of 2 to 3 days. The temperature of the column reactor ranges between the freezing point of wort and +10° C., and the wort is introduced into the reactor at a rate between 0.1 and 2.5 reactor volumes per hour.

BACKGROUND OF THE INVENTION

As used in different countries, the concept "non-alcoholic beer" refers to different kinds of products. In Spain, a product having an alcohol content of less than 1 is regarded as non-alcoholic while in Holland the limit is 0.5%. In the Arab countries, the alcohol content of non-alcoholic beer must not exceed about 0.05 by volume. In the U.S. and some other countries, a beverage having an alcohol content of less than 0.5% can not be called beer.

It is known from the prior art to produce nonalcoholic beer by batch-type processes, which, however, are difficult to carry out (see e.g. U.S. Pat. Nos. 4,746,518 and 4,661,355). Wort is treated at a low temperature of about 0° C. to prevent the formation of alcohol.

In batch-type processes, it has proved difficult to keep the process parameters, such as the delay, the temperature, and the concentration of dissolved oxygen, precisely at the desired values (at equilibrium). Even a minor deviation from the desired values may result in the formation of alcohol, so that the alcohol content of the product obtained is in excess of the value allowed in, for instance, the Arab countries, that is, 0.05% by volume.

Furthermore, a process is known from the prior art for the production of non-alcoholic drinks at a relatively low temperature, 2 to 15° C. (EP 0 213 220). In the process, aerated wort is passed rapidly through a reactor containing immobilized yeast. This process, however, is not particularly suitable for continuous production because the reactor clogs in a very short time.

DETAILED DESCRIPTION OF THE INVENTION

The process of the invention enables continuous industrial production of beer with a very low alcohol content or even substantially non-alcoholic beer meeting the strict alcohol regulations in the Arab countries. The entire production process can be completed as rapidly as within 1 to 2 days.

Essential in the process of the invention is that the yeast treatment is carried out at a low temperature by a continuous process by means of a packed column reactor containing immobilized yeast. The yeast is bound to the surface of a porous carrier. The carrier is substantially non-compressible. It is composed of a continuous porous matrix, or alternatively, of dimpled or reticulated porous particles. The matrix or particles, in turn, are composed of individual microparticles or microfibers. This carrier structure provides a maximal surface area for the immobilization of yeast cells.

The particulate or matrix character of the carrier is produced by loosely binding, felting, weaving, gluing or agglomerating (hereinafter binding) the microparticles or microfibers together. The binding is accomplished by establishing chemical, adherent or mechanical links at some of the contact points between the individual microparticles or microfibers. Chemical binding is accomplished by causing a chemical cross-linking reaction at these points. Adherent binding is accomplished by agglomerating or gluing the microfibers or microparticles together through the use of an additional ingredient such as a thermoplastic resin. Mechanical binding is accomplished by entangling or knotting the fibers at the contact point or by joining the particles by meshing their surfaces together. In the latter form, the matrix will comprise a continuous structure throughout the reactor, much like cotton fluff of filter paper packed into a tube. Also then, in their final form, the particles will be discrete and individual.

The microfibers or microparticles are composed of any anion exchange substance that can be formed into the desired, rough-surfaced microfibers or microparticles. These substances include native or regenerated cellulose or rayon that is derivatized to provide anion exchange character; synthetic anion exchange resins such as phenolformaldehyde resins, and agarose or dextrin based anion exchange resins. The preferred carrier is a porous, particulate anion exchange resin derived from cellulose or rayon that has been chemically modified to provide anion exchange character. Especially preferred embodiments include microfibers or microparticles of diethylaminoethylene substituted cellulose, adherently bound by agglomeration with polystyrene.

Packed column reactors of the type employed in the present invention typically have a height to diameter ratio of at least about 0.5. It is preferred that the packed column reactor have a height to diameter ratio of at least 1 and it is more preferred that the packed column reactor have a height to diameter ratio of more than about 1.25.

Additionally, the packed column reactors of the type employed in the present invention typically have a pressure drop per meter of column height of less than about 300 kPa/m, preferably less than about 200 kPa/m and most prefereably less than about 100 kPa/m.

It is believed that the electric forces established between the positively charged resin and the negatively charged yeast cells are primarily responsible for the binding of yeast cells to the surfaces of the resin. This binding minimizes substantially the leaching of the yeast yet permits intimate contact between the yeast and the wort.

A packed column reactor has a very high cell content. The system is very suitable for the production of substantially non-alcoholic beer since the fermentation ability of the reactor is easy to control by selecting suitable temperature and flow rate. Beer produced according to the invention contains substantially no yeast cells and is generally very clear, so the final filtration is easy to carry out. Losses of beer are negligible.

In the present invention, the yeast treatment temperature ranges between the freezing point of the wort and +10° C., being preferably between 0.5° and 3° C. if substantially non-alcoholic beer is to be produced. The alcohol content depends not only on the temperature but also on the rate at which the wort is passed through the reactor and the number of yeast cells. If non-alcoholic beer is to be obtained, the delay in the column is typically as short as 1 to 2 hours. The wort is prepared from conventional brewing ingredients, that is, mainly from beer, malt and water. In the production of substantially non-alcoholic beer, greater amounts of adjunct (maize, rice and syrups) can be used. In the production of wort, hop or hop extract, pH adjusting agents and calcium salts are also needed. If desired, flavorants and coloring agents as well as stabilizers can be used as additive.

In addition, it is essential in the process of the invention that the clarified wort is treated at elevated temperature by evaporating or by an adsorbing agent to remove undesirable taste components. Suitable adsorbing agent is activated carbon.

In a preferred method, the wort is "hot stripped" to wash out undesirable volatiles. Hot stripping consists of a vigorous percolation of gas, for example $CO_2$ or preferably $N_2$, through the liquid. The hot stripping is beneficial for two reasons:

1. No oxidation takes place if the liquid is pumped from the cooking vessel to the whirlpool because the stripping gas flows directly through the pipe into the wort and expands in the whirlpool. In this way the wort will not absorb oxygen.
2. In a normal beer production process volatiles will be washed out by fermentation and maturation. By using hot stripping, no natural percolation of gas takes place; the hot stripping effectively replaces the natural percolation during fermentation.

Further, it is essential that the yeast is reactivated intervals of 2 to 30 days, preferably at intervals of one week. The reactivation is carried out by circulating aerated wort at 10° to 15° C. for 10 to 30 hours, preferably for one day. This involves rapid growth of the yeast. The reactivation is stopped by temperature reduction below 3° C. and by displacement of the fermented wort. As the introduction of wort into the reactor is restarted, yeast cells are removed from it during a couple of hours, whereafter the continuous yeast treatment can begin.

The packed column reactor can be regenerated by first displacing the wort from the reactor by hot water and by feeding hot caustic soda through the carrier bed until the color of discharged regeneration solution is uniformly bright. Then the carrier bed is rinsed with water until a pH of about 10 is achieved and neutralized by pumping a suitable dilute acid through the carrier bed. Finally, the carrier is rinsed with water.

The beer produced by the process of the present invention can be blended with beer from another source, e.g., regular beer, to produce a beer with an intermediate alcohol content. Preferably, the other beer has an alcohol content greater than about 3.2 volume percent. For instance, a 0.05 volume percent alcohol beer produced by the process of the present invention can be blended, one to one, with a 5 volume percent alcohol beer to make a 2.7 volume percent alcohol beer.

The following examples are illustrative of the invention. The working examples are not to be regarded as restrictive to the invention, but the characteristic features of the invention are disclosed in the claims.

EXAMPLES

Example 1

Preparation of the packed column reactor Granular DEAE cellulose (GDC) manufactured by Cultor Ltd. according to U.S. Pat. No. 4,355,117 and having a particle size of 470 to 840 micrometers was used as a carrier. In all the experiments, the column was filled, the system was sterilized, and the yeast immobilized according to the following procedure:

With reference to FIG. 1, a hydration vessel 1 was first filled half full with water (1000 liters). The mixer was started and dry carrier (GDC; 400 kg) was transferred to the vessel 1. When the hydration was completed (about 10 hours), the immobilized yeast reactor 2 was filled half full with water (800 l) and the carrier water slurry from the hydration vessel 1 was transferred to the reactor 2. In order to maintain a constant water level in the reactor, the bottom valve on the reactor was adjusted so that the inlet and outlet flows from the reactor were substantially equal. The carrier bed in the reactor was then sterilized with hot dilute caustic soda 3 by pumping it through the reactor 2. The carrier bed was then rinsed with water and neutralized by pumping dilute acid (citric acid) 4 through the carrier bed in the reactor 2. Finally, the carrier bed was rinsed with water, which was displaced by aerated wort.

A yeast slurry ($10^{10}$ cells/ml) was made up in a vessel 5 in the aerated wort. The yeast slurry was then circulated through the carrier bed for about 4 hours, whereby the yeast was bound to the carrier. The reactor 2 was then ready for use in the process.

Example 2

Production and pretreatment of wort

The wort was produced by mashing 4,800 kg of barley malt and 3,960 kg of maize grits.

The barley malt was mixed with 15,500 liters of water (35° C.), and the pH was adjusted to 5.5 (citric acid). The mixture of malt and water was mashed in a vessel temperature programmed for an infusion method as follows: at 38° C. for 20 minutes, at 68° C. for 10 minutes, at 72° C. for 30 minutes and at 76° C. for 30 minutes.

The maize grits were mixed with 13,000 liters of water (68°), and the pH was adjusted to 5.5. The mashing program was as follows: at 68° C. for 20 minutes and at 100° C. for 20 minutes.

The malt and maize mashes were combined, and the wort was separated from the solids in a lautertun and boiled in a wort copper at about 100° C. for about 90 minutes. After pH adjustment (5.1), hop extract (containing 2,800 g of alpha acids) was added to the boiling wort. About ten minutes before the boiling was completed, 10 kg of activated carbon was added. A hot stripping stage, consisting of vigorous percolation of gas, in this case nitrogen gas, was also included to wash out undesirable volatiles. The mixture was transferred into a whirlpool, simultaneously evaporating (about 15% of the liquid volume). The hot break separated in about 30 minutes. Finally, the pH was adjusted to 4.3 using citric acid and the wort was cooled in a plate heat exchanger to about 0° C., filtered, and transferred to a suitable container.

Example 3

Yeast treatment and reactivation of the yeast reactor The wort of Example 2 was fed into the packed column reactor of Example 1. The yeast strain used was *Saccharomyces uvarum* low fermentation yeast; the use volume of the yeast bed was 1 m³; the wort feed rate was 750 l/hour and the temperature varied from 1.5° to 3.0° C. (adjusted so that the alcohol level of the product was about 0.05 vol.%). After the wort of Example 2 had been passed through the reactor for eight days, the immobilized yeast reactor was reactivated by circulating aerated wort at 12° C. for 24 hours. The wort fermented during the reactivation was replaced by fresh wort, the temperature being again lowered below 3° C.; the reactor was allowed to stand for about 2 hours, whereafter the production of non-alcoholic beer was continued as described above.

These conditions are substantially anaerobic.

Example 4

Regeneration of the reactor

The packed column reactor used in the examples was regenerated by feeding a hot (about 60° C.) caustic soda solution (2 sodium hydroxide) through the reactor until the color of discharged regeneration solution was uniformly bright. The column was rinsed with water until the pH of the discharged solution was about 10, and neutralized with sodium pyrosulfite to a pH of about 7. The reactor was rinsed with water and filled with wort, whereafter the yeast slurry was introduced into the reactor (about 10 yeast cells/liter of carrier), and thereafter aerated wort for 24 hours. The reactor so regenerated could be used as such in the process.

We claim:

1. A process for the production of substantially non-alcoholic beer by a continuous yeast treatment at low temperature, comprising the steps of:

preparing a substantially liquid wort;

boiling the wort;

vigorously percolating a gas through the boiled wort under conditions that avoid oxidation in the wort;

thereafter cooling the wort to a temperature between the freezing point of the wort and about 10° C.;

filtering the cooled wort;

passing the cooled filtered wort through a packed column reactor comprising a substantially incompressible anionic carrier having yeast bound thereto.

2. A process according to claim 1 wherein the pressure drop per meter of column height of said packed column is less than about 300 kPa/m.

3. A process for the production of an intermediate alcohol beer comprising the steps of blending the beer produced by the process of claim 2 with a beer having an alcohol content greater than about 3.2 volume percent.

4. A process according to claim 1 wherein the height to diameter ratio of the packed column is greater than about 0.5.

5. A process according to claim 1 wherein oxygen is removed from the wort before the wort is passed into the reactor.

6. A process according to claim 5 wherein said oxygen is removed from the wort by evaporation.

7. A process according to claim 1, wherein said yeast is reactivated at intervals of 2 to 30 days by circulating through said immobilized yeast aerated wort at 10° to 15° C. for 10 to 30 hours.

8. A process according to claim 1 wherein said clarified wort is treated to remove undesirable taste components.

9. A process according to claim 8 wherein said treatment of the wort is evaporation at elevated temperature.

10. A process according to claim 8 wherein said treatment of wort is carried out with an absorbing agent.

11. A process according to claim 1 wherein the wort is passed into the reactor at a rate of between about 0.1 and about 2.5 reactor volumes per hour.

12. A process according to claim 11 wherein the temperature of the packed column reactor ranges from 0.5° to 3° C. and the wort is passed through the reactor at a rate between about 0.5 and 1.5 reactor volumes per hour.

13. A process according to claim 1, further comprising the step of removing substantially all of the oxygen from said wort prior to contact with said yeast.

14. A process according to claim 11 further comprising steps for regeneration of the yeast reactor those steps comprising:

a. washing the used yeast reactor with a caustic solution;

b. adjusting said washed yeast reactor to a pH of about 5.5; and c. inoculating said neutralized yeast reactor with yeast.

15. A process according to claim 1 wherein the gas is selected from the group consisting of $N_2$ and $CO_2$.

16. A process according to claim 14 further comprising the step of:

d. growing the yeast in the yeast reactor by contact with an aerated wort.

* * * * *